Jan. 22, 1952     M. P. LAURENT     2,582,997
CLOSURE
Filed Oct. 20, 1947
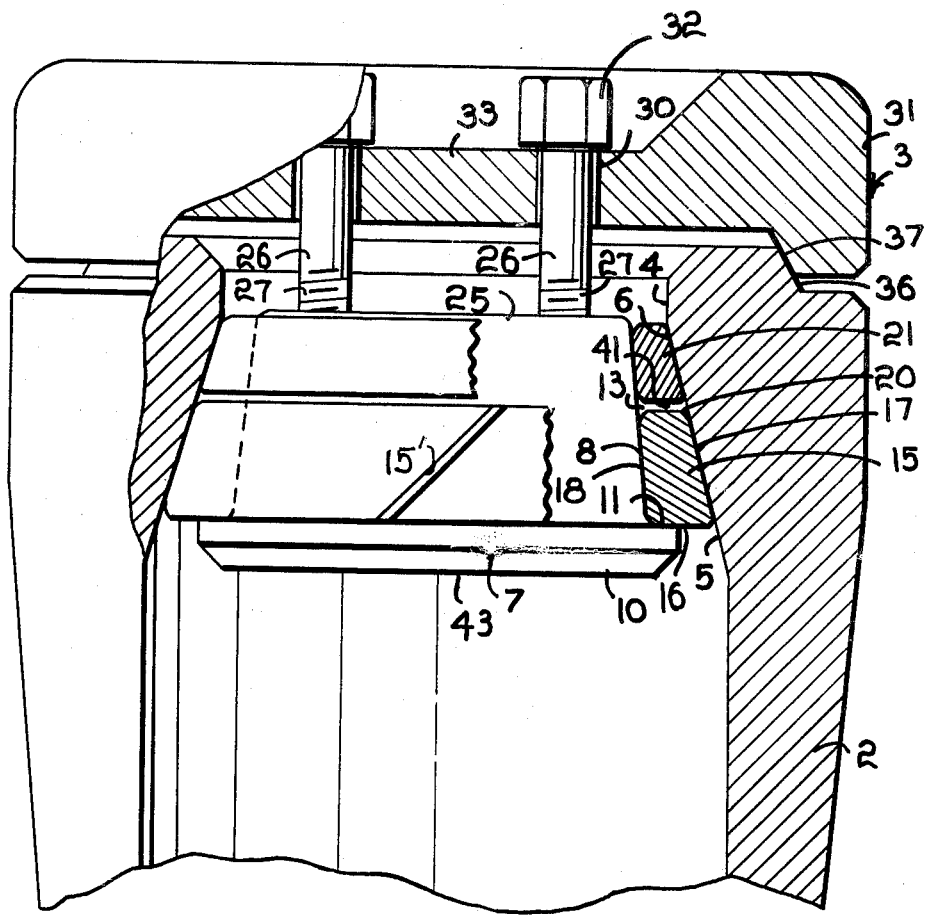
MILTON P. LAURENT
*INVENTOR.*
BY Lester B. Clark
& Ray L. Smith
*ATTORNEY.*

Patented Jan. 22, 1952

2,582,997

UNITED STATES PATENT OFFICE 2,582,997

CLOSURE

Milton P. Laurent, Houston, Tex.

Application October 20, 1947, Serial No. 780,987

8 Claims. (Cl. 220—25)

The invention relates generally to the type of plug and joint structure disclosed in my co-pending application, Serial Number 493,673, filed July 6, 1943; a combination seal and load ring disclosed herein is retained by the pressure which is being sealed and is entitled to the filing date of such earlier application as to all common subject matter.

A great deal of difficulty is encountered in providing a structure which will seal in an opening in pressure vessels, such as hand holes and man holes and clean out openings and in openings in pipe lines and return bends and other special fittings which are subject to internal pressure.

The pressure within the vessel, pipe line, return bend or the like may vary from a few pounds per square inch to thousands of pounds per square inch and heretofore it has been practically impossible to provide a structure which could be inserted through the opening with little difficulty and which would provide a leak proof seal to retain the internal pressure within the vessel.

It has been suggested that the vessel opening be tapered inwardly towards the inside thereof with a plug fitting within such opening and having its annular side surface somewhat spaced from the taper within the hole, thereby providing an annulus or area in which a seal ring could be positioned.

This construction is disadvantageous, in that as the pressure increases it becomes necessary to increase the size and weight of the ring which is to be positioned within the space between the plug and the tapered opening. Beyond certain sizes, the weight of the ring required to withstand the internal pressure is such that it becomes unwieldy, impractical, and is prohibitive due to the weight and size of the ring and the general construction of the closure assembly.

It is, therefore, a primary object of the present invention to provide a closure assembly for an opening in return bends, pipe lines, or pressure vessels which is capable of withstanding high pressures and maintaining a seal to prevent leakage of internal pressure from such opening.

An object of the invention is to provide a load and a seal ring each of which have inner tapered surfaces of a different inclination with respect to the axis through the rings so that the rings may be wedged into position by movement of a member which engages the face having the lesser inclination.

Another object of the invention is to provide a construction which is easily manufactured, relatively inexpensive, but which is efficient in operation.

Another object of the invention is to provide a construction for sealing openings in pressure vessels and the like, which construction may be readily positioned in place in such vessel or may be readily removed from the opening to provide access thereto.

Another object of the invention is to provide a sealing assembly including an inclined wall on the inside of a pressure vessel and a tapered face on a closure member so that a seal ring and a load ring spaced between the two will be held in a load and sealing position by movement of one of the members relative to the other.

A further object of the invention is to provide a closure assembly construction which is provided with a seal ring and a load ring to be positioned between a plug member and a tapered surface within the opening, whereupon internal pressure within such vessel or the like moves the plug so as to wedge the rings in position in the opening.

A further object of the invention is to provide a closure assembly, including separate load and seal rings positioned between a plug member and a tapered surface on an opening within a pressure vessel or the like, the plug member being movable to wedge the load and seal rings into a seal and load contact with the tapered surface within the opening.

A still further object of the invention is to provide a closure assembly for openings in pressure vessels or the like, which comprises independent load and seal rings movable as a unit so as to divide the load carrying and sealing surfaces so that an excessive load due to internal pressure will increase the effective seal.

Other and further objects and advantages of the invention will become more readily apparent from a consideration of the following description and drawing, wherein the general arrangement of the preferred embodiment of the invention is shown.

Referring now to the drawing, a pressure vessel is illustrated at 2, which is shown as being of a substantially circular configuration, but which may be of any desired shape depending upon the purpose to which the pressure vessel is to be applied.

It seems obvious that while the term "pressure vessel" is used in the description of the invention, the invention could be readily adapted to any structure such as return bends, pipe lines or the like, wherein it may be desirable to provide an opening to furnish access to the interior of such return bend, pipe line or the like.

The closure assembly is denoted generally by the numeral 3 and is shown as being positioned in a substantially circular cross sectional opening 4, having its sides tapered as at 5 from the inside of the vessel to the outside as shown at 6.

The closure assembly includes suitable means such as a plug 7, having a tapered surface 8 facing the tapered surface 5 in the opening 4. The surface 8 is tapered in the same direction as is the tapered surface 5 of the opening 4, but the taper of the surface 8 is somewhat less than the tapered surface 5.

Attention is directed to the fact that the maximum diameter of the plug or closure member 7 is somewhat smaller than the minimum diameter of the opening 4, whereby such plug may be inserted therethrough. The inner end of the plug or closure member 7 has a flange 10 integral therewith and somewhat larger than the diameter of the portion of the closure member adjacent the tapered opening, thereby forming a shoulder 11.

It is to be noted that the size of the closure member 7 is such that when it is in position within the opening of the pressure vessel, the side 8 thereof is somewhat spaced from the taper 5 on the sides of the opening 4 thereby providing a space 13 therebetween.

Positioned on the shoulder 11 and fitting within the space 13 is a split ring 15 having its sides tapered at 17 and 18 to conform with the tapered surface 5 and the opposed tapered surface 8 on the closure member 7. The ring is split at an angle with respect to vertical and the ends of two halves are slightly spaced apart whereby the opening 15' is formed through the ring 15 so that internal fluid pressure in the vessel may pass therethrough to contact the seal ring 21. The inner end 16 of such ring is partially seated upon the shoulder 11, the rest thereof presenting an opposed surface area to the internal pressure within the vessel 2 or the like.

The load ring 15 is substantially circular in shape and is formed of material strong enough so that it will not become deformed upon exposure to great pressures. Since the ring 15 is split it need not be flexed to be inserted in place and it can be formed of very hard, heavy metal to withstand great loads encountered at high pressures.

Adjacent the ring 15 and somewhat displaced from the top surface 20 thereof, is another ring 21 fitting within the space 13 between the closure member 7 and the pressure vessel 2. This ring is of substantially the same cross sectional shape as is the ring 15, however, due to the fact that the tapered surfaces 5 and 8 converge outwardly, it is somewhat smaller in size to conform with the distance between the taper 5 on the vessel 2 and the taper 8 on the closure member 7.

Extending outwardly from the opening 4 and secured in the top 25 of the closure member 7 are a plurality of stems 26 connected thereto by suitable means such as the threads 27 on the lower end thereof. Such stems extend through openings 30 within the cap 31 which is positioned over the opening 4 in the pressure vessel 2. A nut 32 may be positioned on the end of the stem 26 so that it engages the top 33 of the cap 31, whereby such cap may be positioned downwardly over the opening, while at the same time the closure member and the load ring 15 and seal ring 21 are moved outwardly so as to wedge the rings in position against the surface 8 of the closure member 7 and the taper 5 in the pressure vessel 2.

While the stems 26 are primarily provided for securing the plug in position within the opening, it seems obvious that such stems also facilitate the entry and removal of the closure member or plug 7 within the opening 4.

To assist the cap 30 in seating firmly upon the opening 4, a taper 36 on the end of the pressure vessel is arranged to substantially conform to taper 37 formed by the shoulder 38 on the cap 30. As such cap is positioned down over the opening, the surfaces 36 and 37 are in sliding engagement, whereby the cap is urged into more intimate contact with the pressure vessel 2 to retain the plug 7 and seal and load rings in position.

Attention is directed to the fact that internal fluid pressure within the vessel 2 will be transmitted through the opening 15' to exert a pressure against the surface 41 of the seal ring and downwardly on the surface 20 of the load ring. The pressure, therefore, on the surface 16 of the load ring and in the space 13 acting downwardly on the surface 20 is substantially equal so that little or no pressure is carried by the load ring per se.

It seems obvious that as a practical matter, the effective surface against which the pressure load within the vessel is working is the area of the surface 41 plus the area of the plug 7 on a plane substantially at the lower end of the seal ring 21. Since the area of the plug on this plane is approximately 4 to 6 times greater than the exposed area 41 of the seal ring 21, the plug 7 will tend to move upward because more pressure is being exerted against it than against the seal ring 21. However, the plug 7 can not move upward unless the load ring 15 and the seal ring 21 move also. All load, therefore, is transmitted to the heavy load ring 21 and if any movement upward is caused by a high pressure, then the plug 7, the load ring 15, and seal ring 21 all move upward as a unit.

While the operation of the invention is to be apparent from the foregoing by way of summary and further illustration, it will be assumed that the closure assembly is to be positioned in a circular opening as shown in the drawing.

The closure member or plug 7 will be inserted through the opening 4 and then the load ring 15 is positioned on the shoulder 11. The seal ring 21 is deflected and inserted through the opening within the space 13 between the plug and vessel 2. The load ring 15 is seated upon the shoulder 11 and seal ring 21 spaced somewhat therefrom, thereby exposing the surface 41 of its inner end.

The cap 30 is then positioned on the stems 26 to secure such cap and plug member together. As the cap is positioned down over the opening 4 by means of the stems 26 and nuts 32, the seal ring 21 and load ring 15 will be urged into position between the plug and the taper 5 on the opening 4.

The internal pressure within the vessel acts against the end 43 and the opposed surface 16 of the ring 15 to tend to force such plug and ring outwardly through the opening 4; the internal pressure also acts on the upper surface 20 of the load ring 15 with an equal and opposite force to that acting on surface 16. The internal pressure also exerts a force on the exposed surface 41 of the seal ring 21.

As hereinabove described, the plug or closure member 7 will tend to be forced outwardly through the opening since the area of the member 7 exposed to the internal pressure is greater than that of the seal ring 21. However, no movement of the plug 7 can occur unless and until the load ring 15 and seal ring 21 also move as a unit therewith. The majority of the load will be carried by the hard, heavy load ring and when the plug or closure member is forced slightly due to internal pressure, the load ring will bear the brunt of the load and will be moved slightly by a high pressure. As such movement of the load ring occurs the seal ring will be more effectively wedged into its position thereby maintaining a seal between the outwardly converging tapers 5 and 8 to prevent leakage of the pressure fluid from the closure assembly.

As the closure member 7 moves into the seal ring 21 and load ring 15 along the relatively smaller taper, it will wedge the rings tightly between the plug 7 and the tapered wall 8 of the opening to form a seal, but this wedging action by the relatively small taper of the plug will be governed by the flange 11 which is in contact with the load ring 15. Pressure tending to move the plug through the opening will cause the plug and rings to move as a single unit, and in the course of this movement this composite assembly will act as a load and seal wedge with the larger angle of taper 8 on which the wall of the opening is formed.

The reason for the construction above described is that the radial component of the force on the plug and within the vessel will be exerted in a radial direction to be carried by the load ring 15. The plug 7 in turn forms a seal with the seal ring 21 which forms a seal with the inside of the opening in the pressure vessel. As the pressure within the vessel builds up, there is built up a very large hoop tension in the metal of the vessel surrounding the opening and this tension, if allowed to increase indefinitely as the pressure within the vessel increases, would either rupture the vessel or necessitate a design of vessel with much larger wall sections about the opening. Therefore, due to the fact that the closure assembly moves as a unitary structure, the action of the relatively slight taper is lessened so that the pressure upon the closure member 7 will be taken by the relatively larger taper 5 within the opening, and it is readily seen that the mechanical advantages and the wedging action due to this relatively larger taper will be much less than on the smaller taper and that the increased hoop tension created thereby will be correspondingly less.

It is further to be noted that the angles of the tapers both within the opening and on the plug are sufficiently large so as to prevent either the plug within the ring or the ring within the opening from acting as a sticking wedge. Such angles are relatively well known and in the case of steel it is known that if the included angle between the opposite sides of a wedge is less than 18 degrees the wedge will probably stick but that if such angle is equal to or greater than 18 degrees there will be no sticking and the wedge may easily be removed. Inasmuch as it is one of the objects of this invention to provide a closure which may be easily removed when necessary and in which the parts will not be damaged and hence may be reused, the angles involved are made of such size as to provide a non-sticking wedge.

If the invention is practiced on large openings, such as openings for example having 24" diameters, then the load ring may be made in one piece since it is so large that it may be flexed and inserted in position. Openings 15' may be drilled axially therethrough to expose the surface 41 of the seal ring 21.

If it is desired to remove the closure assembly from the vessel, it is only necessary that the nuts 32 be removed from the stems 26, whereupon the cap 30 may be removed exposing the opening 4. The rings 21 and 15 may be removed from the opening and the closure member or plug 7 may then be withdrawn, thereby exposing the interior of the vessel 2.

Broadly the invention contemplates a closure assembly for pressures or the like which is constructed so as to withstand high pressures and heavy loads.

What is claimed is:

1. In combination with a pressure vessel having an outwardly tapered substantially circular opening therein, a substantially circular closure for said opening having its outer edge of a lesser taper but in the same direction as said opening and its maximum diameter less than the minimum diameter of said opening, a resilient metal sealing ring having its outer and inner surfaces tapered to the same tapers as said opening and closure respectively, and a rigid metal load ring axially aligned therewith having its outer and inner surfaces tapered to the same tapers as said opening and closure respectively.

2. In combination with a pressure vessel having an outwardly tapered substantially circular opening therein, a closure member for said opening, said closure member being of a diameter to fit within said opening through the taper thereon, a non-compressible metal seal ring fitting between said closure and opening, and a separate non-compressible metal load ring fitting between said closure and opening and axially aligned with said seal ring, the taper on the outer surfaces of each said seal and load rings conforming with the taper of said opening whereby pressure within the vessel urges said rings into sealing engagement with said closure member and vessel.

3. In combination with a pressure vessel having an outwardly tapered substantially circular opening therein, a closure member for said opening, said closure member being a diameter to fit within said opening adjacent the taper thereon, a non-compressible metal seal ring fitting between said closure and opening, and a non-compressible metal load ring fitting between said closure and opening and axially aligned with said seal ring, the taper on the outer surfaces of each said seal and load rings conforming with the taper of said opening whereby pressure within the vessel urges said rings into sealing engagement with said closure member and vessel, said rings being distortable diametrically to enable them to be inserted through said opening when the maximum outside diameter of said rings in circular shape is less than the maximum diameter and greater than the minimum diameter of said opening.

4. In combination with a pressure vessel having a substantially circular opening defined by an edge tapered toward the outside and machined to form a seat, a closure member for the opening capable of being passed through said opening having a machined edge of a lesser taper but in the same direction as said seat, a seal ring of spring like material adaptable to fit between said closure edge and said seat and having machined surfaces to fit the surfaces of said closure edge and seat respectively, and a load ring adaptable to fit between said closure edge and said seat, said load ring being axially aligned and having machined surfaces to fit the surfaces of said closure edge and seat respectively.

5. In combination with a pressure vessel having a substantially circular opening defined by an edge tapered toward the outside and machined to form a seat, a closure member for the opening capable of being passed through said opening having a machined edge of a lesser taper but in the same direction as said seat, a seal ring of spring like material adaptable to fit between said closure edge and said seat and having machined surfaces to fit the surfaces of said closure edge and seat respectively, and a load ring adaptable to fit between said closure edge and said seat, said load ring being axially aligned and having machined surfaces to fit the surfaces of said closure edge and seat respectively, each of said rings being sufficiently resilient to permit their passage through said opening and to thereafter seat on said surfaces so that internal pressure effects movement of said closure to wedge said ring against the vessel edge to provide a seal.

6. A closure assembly for pressure containers having an opening, the wall defining such opening being an outwardly tapering surface, a closure plug having an outwardly converging tapered peripheral surface of a lesser taper than the taper of said wall, the maximum diameter of said plug being less than the minimum diameter of the opening so that the plug may be inserted therethrough, said wall surface and plug surface being spaced apart when the plug is in operative position to provide a space therebetween, a sealing ring of a resilient non-compressible material having inner and outer peripheral tapering surfaces corresponding to the adjacent plug and wall surfaces respectively, a load ring axially alignable with said seal ring and having tapering surfaces corresponding to the adjacent plug and wall surfaces respectively and means for manually drawing said plug outwardly to force said seal and load rings against the opening wall.

7. A closure assembly for pressure containers having an opening, the wall defining such opening being an outwardly tapering surface, a closure plug having an outwardly converging tapered peripheral surface of a lesser taper than the taper of said wall, the maximum diameter of said plug being less than the minimum diameter of the opening so that the plug may be inserted therethrough, said wall surface and plug surface being spaced apart when the plug is in operative position to provide a space therebetween, a sealing ring of a resilient non-compressible material having inner and outer peripheral tapering surfaces corresponding to the adjacent plug and wall surfaces respectively, a load ring axially alignable with said seal ring and having tapering surfaces corresponding to the adjacent plug and wall surfaces respectively, and means for manually drawing said plug outwardly to force said seal, and load rings against the opening wall and means on said plug to abut said rings and wedge them against the wall surface of the container due to pressure within the vessel.

8. In a closure and sealing assembly for pressure vessels an opening having a converging tapered wall face, a closure plug movable through said opening, a tapered peripheral face on said plug of a lesser taper relative to the axis of the opening than the taper of said wall face whereby said annularly spaced opening and plug face create a frusto conical annular space therebetween, and a pair of independent frusto conical annular rings insertable through said opening to fit upon the periphery of said plug in axial spaced relation, said rings each having an outer peripheral face to fit said opening wall face, the inner of said rings being a split ring to carry the load, the outer of said rings being a sealing ring, said sealing ring being a solid annular ring.

MILTON P. LAURENT.

REFERENCES CITED

The following references are of record in the file of this patent:

UNITED STATES PATENTS

| Number | Name | Date |
|---|---|---|
| 600,443 | O'Brien | Mar. 8, 1898 |
| 724,939 | Reis | Apr. 7, 1903 |
| 1,216,771 | Booth | Feb. 20, 1917 |
| 2,016,227 | Clausen | Oct. 1, 1935 |
| 2,016,228 | Clausen | Oct. 1, 1935 |
| 2,309,122 | Keenan, Jr. | Jan. 26, 1943 |
| 2,390,445 | Mercier | Dec. 4, 1945 |
| 2,426,392 | Fennema | Aug. 26, 1947 |
| 2,428,963 | Fennema et al. | Oct. 14, 1947 |

FOREIGN PATENTS

| Number | Country | Date |
|---|---|---|
| 3,143 | Great Britain | 1891 |
| 143,136 | Germany | Aug. 5, 1903 |
| 485,970 | Germany | Nov. 13, 1929 |
| 530,016 | Great Britain | Dec. 3, 1940 |